Patented Dec. 29, 1936

2,065,744

UNITED STATES PATENT OFFICE 2,065,744

DIRECT PROCESS FOR MAKING SODIUM PERBORATE

Joseph S. Reichert, Niagara Falls, N. Y., assignor to E. I. du Pont de Nemours & Company, Wilmington, Del., a corporation of Delaware No Drawing. Application May 27, 1932, Serial No. 614,047

16 Claims. (Cl. 23—60)

This invention relates to the manufacture of perborates and more particularly to the manufacture of alkali metal perborates in solid form.

Alkali metal perborates such as sodium perborate have been made heretofore by reacting boric acid, borax or other borates with alkali metal peroxide or with hydrogen peroxide in the presence of alkali. These processes are all carried out in aqueous solution and the product separated either by crystallizing it out of the solution or by evaporating the solution at low temperatures, for instance under vacuum. If the product is obtained by crystallization, the crystals after filtering or centrifuging to remove liquid must be completely dried at low temperatures, this drying temperature often requiring as long as 48 hours to complete. Many of these prior methods of manufacturing perborates give unsatisfactory yields and products of relatively low stability. They are all characterized by the tedious and expensive operation of evaporation or drying at low temperatures over extended periods of time. During such extended periods of drying more or less decomposition of the perborate occurs resulting in a product of lowered active oxygen content.

In one particular process, borax is reacted in water solution with sodium peroxide and the excess sodium hydroxide formed by the reaction neutralized by passing in carbon dioxide. The perborate crystallizes and when the crystals have been separated a solution of sodium carbonate remains as by-product. Unless the manufacturer has at hand a use for a sodium carbonate solution, this by-produce is of little or no value and usually is wasted.

An object of this invention is to provide a process for the direct manufacture of a dry solid alkali metal perborate without the necessity of separating the solid product from residual liquid with avoidance of drying or evaporating operations extending over long periods of time. Other objects are to prepare alkali metal perborate without producing useless or troublesome by-products; and to produce a product in improved yields and of high quality and stability.

I accomplish these objects by reacting boric acid, its anhydride, or an alkali metal borate with a solution of hydrogen peroxide and an alkali metal peroxide under such conditions that the total amount of combined and uncombined water present in the reaction mixture is substantially equivalent to or less than the amount of water which finally appears as water of crystallization or hydration in the final product.

By thus reacting the starting materials while maintaining the amount of water at a minimum quantity, a mass of cheesy consistency is obtained which contains little or no excess of water over that required for water of crystallization in the final product, for instance $NaBO_3 \cdot 4H_2O$. On standing a few hours, this substance is transformed into a hard, dense, white mass of substantially pure alkali metal perborate, which will be either partially or completely hydrated, depending on the amount of water used. During this transformation, considerable heat is developed, the temperature of the mass being raised to around 50–70° C. in some cases. Because of this generation of heat, it is probable that transformation comprises hydration of the perborate. The hard mass of perborate may be ground or pulverized as desired to form a dry powder.

I have thus produced by a simple reaction without a drying stage a substantially dry product. That is, my product, while it may be completely hydrated and may contain small amounts of uncombined water, nevertheless, when ground, possesses all the characteristics of a substantially dry material; this dry product is suitable for immediate packing and shipping. I therefore designate my product in the appended claims as a dry product.

To illustrate the invention, the preparation of sodium perborate from boric acid will be described. Two molar equivalents of solid powdered boric acid ($H_3BO_3$) are stirred into a hydrogen peroxide solution which contains one molar equivalent of hydrogen peroxide and not less than 32% hydrogen peroxide by weight. One molar equivalent of pulverized sodium peroxide then is added to the reaction mass and the whole is agitated until the reaction is complete. As the sodium peroxide reacts, heat is generated and a thick slurry is gradually formed. If the mixture is cooled to around 35° C., it becomes of a thick cheesy consistency. In this state it may be allowed to solidify preferably by spreading it out on flat surfaces at ordinary temperature. Within four hours it solidifies to a dense, hard, white solid. The product is substantially pure hydrated sodium perborate ($NaBO_3 \cdot 4H_2O$) which may be stored over long periods of time without substantial decomposition. During the transformation to a hard mass, some water is evaporated because of the heat developed. For this reason, if a completely hydrated product, for instance $NaBO_3 \cdot 4H_2O$, is desired, it is necessary to have present sufficient excess of water to allow for this evaporation; I have found that an excess of about 8% is sufficient when making sodium perborate. However, care must be taken not to use so large an excess of water that substantially more than that required for complete hydration is present after the transformation step, because such excess of water tends to prevent hardening of the mass. On the other hand, there is no objection to the use of less than the theoretical amount of water required for complete hydration, which results in an incompletely hydrated product. In the case of sodium perborate, such incompletely hydrated product is probably a mixture of the monohydrate ($NaBO_3 \cdot H_2O$) and the tetrahydrate ($NaBO_3 \cdot 4H_2O$). In general, the incompletely hydrated products require a somewhat longer time to harden.

During the addition of the alkali metal peroxide, it is preferable to apply cooling means to prevent undue decomposition of the hydrogen peroxide which might be caused by the heat developed during the reaction. Preferably the temperature should not be allowed to rise above 80° C.; however, fair yields may be obtained by reacting at even higher temperatures. In addition to cooling, the decomposition of peroxide may also be inhibited by adding to the reaction mixture a small amount of any of the well known peroxide stabilizers. For instance, I have obtained good results by using as stabilizers magnesium silicate, magnesium sulphate, sodium silicate, sodium pyrophosphate, and sodium orthophosphate. These stabilizers are used in small amounts for instance around 0.3% of the total weight of the reactants and I have found that, other conditions being constant, their use increases the yield by about 3%.

The following example more specifically illustrates the invention.

Example I

Sixty-one cubic centimeters of 123.5 volume hydrogen peroxide at around 30° C., containing 0.72 gram of sodium pyrophosphate ($Na_4P_2O_7 \cdot 10H_2O$), was placed in a reaction vessel equipped with a mechanical stirrer and 85.9 grams of solid powdered boric acid was added to the peroxide with stirring. Fifty grams of 98.9% pure sodium peroxide, powdered and screened to about 30 mesh size, was slowly added to the reaction mixture with continued agitation, while maintaining a temperature below 50° C. by cooling the reaction vessel. The mixture was stirred at around 50° C., for 10 minutes, cooled to about 35° C. and stirred at this temperature until the mass began to solidify. After a few hours the product had set to a hard, dry solid, containing 10.52% of active oxygen. The active oxygen yield, based on the total peroxide used, was 97.3%.

For the commercial production of sodium perborate I prefer to use borax as a raw material because it is readily available and relatively inexpensive. The borax of commerce contains water crystallization as represented by the formula: $Na_2B_4O_7 \cdot 10H_2O$. If this substance is used as raw material for my process the hydrogen peroxide used must contain not less than about 65% by weight of hydrogen peroxide. Since such peroxide solutions are difficult and expensive to make, I prefer to first dehydrate part or all of the borax used until enough water is thereby excluded from the reaction so that a lower concentration of hydrogen peroxide may be used, for instance one containing 30% to 40% of $H_2O_2$ by weight. The use of borax as a raw material in my process is illustrated by the following example.

Example II

The process described in Example I was repeated, using in place of boric acid a partially dehydrated borax containing approximately 49 molar per cent of water of crystallization. Eighty-two and three tenths grams of the borax was reacted with 93 cc. of 125 volume hydrogen peroxide solution and 25 grams of 95.5% pure sodium peroxide in the presence of 0.72 gram of sodium pyrophosphate ($Na_4P_2O_7 \cdot 10H_2O$). The reaction temperature was maintained between 40 and 50° C. until the reaction was complete. The mixture then was cooled to 35° C. and stirred until it reached the consistency of soft cheese, whereupon the material was spread on glass plates and allowed to stand at room temperature. After about 4 hours it solidified to form a hard, dense, white, substantially pure, hydrated sodium perborate. A 99% active oxygen yield, based on the total peroxide used, was obtained.

In place of alkali peroxide, alkali hydroxide with an excess of hydrogen peroxide may be used in my process. The following example illustrates this method of carrying out the invention.

Example III

About 0.7 gram of sodium pyrophosphate ($Na_4P_2O_7 \cdot 10H_2O$) was added to 90 cc. of 158 volume hydrogen peroxide solution. The pyrophosphate was added to serve as stabilizer. This solution was reacted with 25 grams of solid sodium hydroxide and 73 grams of substantially anhydrous borax by adding the borax and sodium hydroxide alternately in small portions with continued agitation. Otherwise the process was carried out in the same manner as described in Examples I and II. A 97% yield of sodium perborate was obtained.

It is obvious from the above description and examples that boric acid, its anhydride, or various borates or mixtures thereof may be used as raw materials. The strength of the hydrogen peroxide may vary over a considerable range provided that the amount of water thereby added together with any water introduced with the other reactants is not too great to prevent solidification of the reaction mixture. I prefer to adjust the water content of the reaction mixture so that not more than about 8% excess above that theoretically required for complete hydration of the final product is present. I also prefer to use a small excess, for instance about 2% excess, of hydrogen peroxide in order to allow for the slight decomposition which may occur during the reactions. The relative proportions of boric acid derivative and alkali metal peroxide may be varied considerably, depending upon the purity of the product desired. I prefer to use substantially stoichiometric proportions of these reactants in order to obtain a substantially pure stable product.

The temperature of the reaction may also be varied within wide limits without departing from the scope of my invention. I have obtained good yields, for instance yields of around 90%, by carrying on the reaction at temperatures as high as 80° C. In general the yield is decreased as the reaction temperature is allowed to increase, due to the increased hydrogen peroxide decomposition. Hence, I prefer to carry out the reaction at around 50° C. If the temperature is allowed to go below 45° C., there is a tendency for the mixture to solidify before the alkali metal peroxide has completely reacted.

In order to obtain the highest yields and a product of the highest purity and stability, I prefer to agitate the reaction mixture very thoroughly throughout the process and especially during and after the addition of the peroxide. The alkali metal peroxide is preferably added in small amounts or in a small stream at such rate that no large amount is allowed to accumulate on the surface of the mixture. The agitation should be continued until substantially all of the peroxide has reacted. This usually requires 5–10 minutes and may be determined by trial.

My process results in a product of high purity which may be stored over long periods of time with unusually low rate of decomposition. The stability of the product of my direct process is greater than that obtained by wet methods. The following example illustrates the high stability of the perborates made by my process.

*Example IV*

Three batches of sodium perborate of about 200 grams each were made from partially dehydrated borax, hydrogen peroxide and sodium peroxide in accordance with the herein described process. Samples of each batch were analyzed to determine the active oxygen content. Two 100 gram samples of each batch then were placed in stoppered glass flasks and stored for six months in a cabinet wherein the temperature was maintained close to 32° C. At the end of the six months' period, these samples were removed and again analyzed for the active oxygen content. The results of this test are given in the following table:

| Sample number | Original active oxygen content in sample | Active oxygen lost during storage |
|---|---|---|
| | Grams | Grams |
| 1 | 9.78 | 0.254 |
| 2 | 9.78 | 0.264 |
| 3 | 9.93 | 0.158 |
| 4 | 9.93 | 0.129 |
| 5 | 9.97 | 0.279 |
| 6 | 9.97 | 0.299 |

My novel process for making perborates possesses a number of advantages over methods heretofore employed. It is a single stage process and may be completed in one operation and in the one reaction vessel. It is relatively inexpensive and produces perborates of high purity and stability in excellent yield. It avoids costly operations such as evaporation under vacuum or drying over long periods of time. It is not restricted to the use of any particular boric acid derivative as raw material and produces no undesirable or wasteful by-products.

In the appended claims, the term "boric acid derivative" is used to include boric acid, its anhydride and salts thereof.

I claim:

1. A process for the manufacture of alkali metal perborates which comprises reacting a boric acid derivative selected from the group which consists of boric acid, boric anhydride and alkali metal borates, in the solid state, with an alkali metal peroxide and a solution of hydrogen peroxide in the requisite proportions at a temperature below 80° C., the total amount of combined and uncombined water present in the reaction mixture being limited to not more than 8% in excess of the amount required to form the completely hydrated final product.

2. A process for the manufacture of alkali metal perborates which comprises reacting an alkali metal borate in the solid state with an alkali metal peroxide and a solution of hydrogen peroxide in the requisite proportions at a temperature below 80° C., the total amount of combined and uncombined water present in the reaction mixture being limited to not more than about 8% in excess of the amount required to form the completely hydrated final product.

3. A process for the manufacture of alkali metal perborates which comprises reacting an alkali metal borate in the solid state with an alkali metal hydroxide and a solution of hydrogen peroxide in the requisite proportions at a temperature below 80° C., the total amount of combined and uncombined water present in the reaction mixture being limited to not more than about 8% in excess of the amount required to form the completely hydrated final product.

4. A process for the manufacture of alkali metal perborates which comprises reacting an alkali metal borate in the solid state with a solution of hydrogen peroxide and an alkali metal peroxide in the requisite proportions at a temperature below 80° C., the total amount of combined and uncombined water present in the reaction mixture being limited to not substantially more than that amount which will result in a completely hydrated final product and in any event not exceeding about 8% in excess of that quantity theoretically required for the formation of a completely hydrated product.

5. A process for the manufacture of alkali metal perborates which comprises reacting an alkali metal borate in the solid state with a solution of hydrogen peroxide in the requisite proportions at a temperature below 80° C., reacting the resulting reaction mixture with solid alkali metal peroxide in the requisite proportions to produce a mass of cheesy consistency, the total amount of combined and uncombined water present in the reaction mixture being limited to not more than 8% in excess of the amount required to form the completely hydrated final product.

6. A process for the manufacture of alkali metal perborates which comprises reacting an alkali metal borate in the solid state with a solution of hydrogen peroxide in the requisite proportions, reacting the resulting reaction mixture with solid alkali metal peroxide in the requisite proportions at a temperature below about 80° C., the total amount of combined and uncombined water present in the reaction mixture being limited to substantially not more than that amount which will result in a completely hydrated product, said amount not exceeding about 8% in excess of that quantity required for complete hydration of the final product, thereafter cooling the reaction mixture with continued agitation to produce a mass of cheesy consistency and subsequently allowing said mass to harden.

7. A process for the manufacture of alkali metal perborates which comprises reacting an alkali metal borate in the solid state with a solution of hydrogen peroxide in the requisite proportions, reacting the resulting reaction mixture with alkali metal peroxide in the requisite proportions at a temperature within the range 40 to 50° C., the total amount of combined and uncombined water present in the reaction mixture being limited to substantially not more than that amount which will result in a completely hydrated final product, and not exceeding 8% in excess of that quantity theoretically required for complete hydration of the final product, thereafter cooling the reaction mixture with continued agitation to produce a mass of chessy consistency and subsequently allowing said mass to harden.

8. A process for the manufacture of sodium perborate which comprises reacting partially dehydrated borax with a concentrated solution of hydrogen peroxide and solid sodium peroxide in the requisite proportions at a temperature below 80° C., the total amount of combined and uncombined water present in the reaction mixture being limited to not more than 8% in excess of the amount required to form the completely hydrated final product.

9. A process for the manufacture of sodium perborate which comprises reacting partially dehydrated borax with a concentrated solution of hydrogen peroxide and solid sodium peroxide in the requisite proportions at a temperature below 80° C., the total amount of combined and uncombined water present in the reaction mixture being limited to substantially not more than that amount which will result in a completely hydrated final product, said amount being less than 8% in excess of that quantity theoretically required for the formation of a completely hydrated product.

10. A process for the manufacture of sodium perborate which comprises reacting partially dehydrated borax with sodium peroxide and a concentrated solution of hydrogen peroxide at a temperature within the range 40 to 50° C., said reactants being present in substantially stoichiometrical proportions, the total amount of combined and uncombined water present in the reaction mixture being limited to not more than about 8% in excess of the amount required to form the completely hydrated final product.

11. A process for the manufacture of sodium perborate which comprises reacting partially dehydrated borax with a concentrated solution of hydrogen peroxide, reacting the resulting reaction mixture with sodium peroxide while agitating the same at a temperature below 80° C., the reactants being present in the requisite proportions, the total amount of combined and uncombined water present in the reaction mixture being substantially not more than that amount which will result in a completely hydrated product and not exceeding about 8% in excess of that quantity required to form a completely hydrated final product, thereafter cooling the reaction mixture with continued agitation to obtain a mass of cheesy consistency and subsequently allowing said mass to harden.

12. A process for the manufacture of sodium perborate which comprises reacting partially dehydrated borax with a concentrated solution of hydrogen peroxide, reacting the resulting reaction mixture with sodium peroxide while agitating the same at a temperature of 40 to 50° C., said reactants being present in substantially stoichiometrical proportions, the total amount of combined and uncombined water in the reaction mixture being limited to not more than about 8% in excess of that amount required to completely hydrate the final product, thereafter cooling the reaction mixture to about 35° C. with continued agitation to produce a mass of cheesy consistency and subsequently allowing said mass to harden.

13. A process for the manufacture of alkali metal perborates which comprises reacting solid boric acid with a concentrated solution of hydrogen peroxide and an alkali metal hydroxide, the reactants being present in the requisite proportions at a temperature below 80° C., the total amount of combined and uncombined water present in the reaction mixture being limited to not more than about 8% in excess of the amount required to form the completely hydrated final product.

14. A process for the manufacture of alkali metal perborates which comprises reacting solid boric acid with a concentrated solution of hydrogen peroxide, reacting the resulting reaction mixture with alkali metal peroxide at a temperature of 40 to 50° C., the reactants being present in the requisite proportions, the total amount of combined and uncombined water in the reaction mixture being limited to substantially not more than that amount which will result in a completely hydrated product and not exceeding about 8% in excess of that quantity theoretically necessary for a completely hydrated final product, thereafter cooling the reaction mixture with continuous agitation to produce a mass of cheesy consistency and subsequently allowing said mass to harden.

15. A process for the manufacture of sodium perborate which comprises reacting solid boric acid with a concentrated solution of hydrogen peroxide and sodium peroxide, the reactants being present in the requisite proportions, at a temperature below 80° C., the total amount of combined and uncombined water present in the reaction mixture being limited to not more than about 8% in excess of the amount required to form the completely hydrated final product, the amount of water entering the reaction by way of the reactants being limited to such an amount as will result in the direct formation of a substantially dry product and in any event not exceeding about 8% in excess of that amount theoretically necessary to form a completely hydrated final product.

16. A process for the manufacture of sodium perborate which comprises reacting solid boric acid with a concentrated solution of hydrogen peroxide and sodium peroxide in the requisite proportions at a temperature below about 80° C., the total amount of combined and uncombined water present in the reaction mixture being restricted to substantially not more than about 8% in excess of that amount necessary to form a completely hydrated final product.

JOSEPH S. REICHERT.